United States Patent [19]

Brumlik et al.

[11] 4,050,873
[45] Sept. 27, 1977

[54] TRAIN MOLDING APPARATUS

[76] Inventors: George C. Brumlik, 154 Upper Mountain Ave., Montclair, N.J. 07042; Bernard I. Bartner, 229-07 58th Ave., Bayside, Queens, N.Y. 11364

[21] Appl. No.: 754,085

[22] Filed: Dec. 23, 1976

Related U.S. Application Data

[63] Continuation of Ser. No. 559,284, March 17, 1975, abandoned, which is a continuation of Ser. No. 317,034, Dec. 20, 1972, abandoned.

[51] Int. Cl.$^2$ .......................... B29C 7/00; B29C 15/00
[52] U.S. Cl. ..................................... 425/371; 425/575; 425/335; 425/DIG. 44; 425/DIG. 58
[58] Field of Search ............... 425/246, 337, 362, 364, 425/371, DIG. 44, DIG. 19, DIG. 58, 294, 113, 116, 122, 392, 115, 817 R, 329, 122, 127, 370, 124

[56] References Cited

U.S. PATENT DOCUMENTS

| | | | |
|---|---|---|---|
| 847,727 | 12/1868 | Bitner | 425/362 X |
| 862,558 | 8/1907 | Hiscock | 425/362 |
| 980,144 | 12/1910 | Cowley | 425/362 X |
| 1,265,138 | 5/1918 | Taylor | 425/362 X |
| 1,751,430 | 3/1930 | Thomson | 425/DIG. 44 |
| 2,668,987 | 2/1954 | Harris et al. | 425/DIG. 44 |
| 2,817,875 | 12/1957 | Harris et al. | 425/DIG. 44 |
| 2,835,924 | 5/1958 | Schweling | 425/DIG. 44 |
| 2,931,063 | 4/1960 | Harris | 425/DIG. 44 |
| 3,011,218 | 12/1961 | Mitten | 425/DIG. 44 |
| 3,020,587 | 2/1962 | Alderfer et al. | 425/DIG. 44 |
| 3,098,262 | 7/1963 | Wisotzky | 425/805 |
| 3,196,490 | 7/1965 | Erb | 425/814 |
| 3,509,937 | 5/1970 | Radd | 264/166 |
| 3,752,619 | 8/1973 | Menzin | 425/440 |
| 3,840,316 | 10/1974 | Poeschl | 425/440 |

Primary Examiner—J. Howard Flint, Jr.

[57] ABSTRACT

Three-dimensional articles are molded from materials capable of flow utilizing a. a molding zone having a plurality of advancing contiguous molds with adjacent molds forming mold cavities at contiguous interfaces transverse to the direction of motion.

b. a discharge zone following the molding zone wherein said molds travel in an arcuate path, become separated from each other and the mold cavities are opened;

c. feeding a material capable of flow to the molding zone, forcing same into said mold cavities and solidifying same therein; and withdrawing said molded articles from the discharge zone.

13 Claims, 37 Drawing Figures

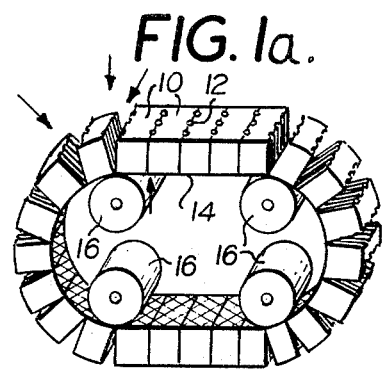
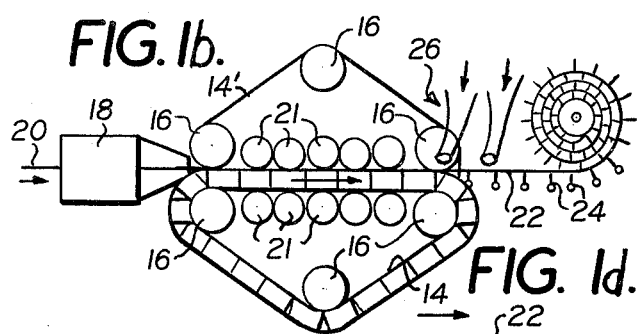
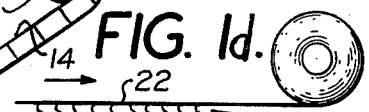
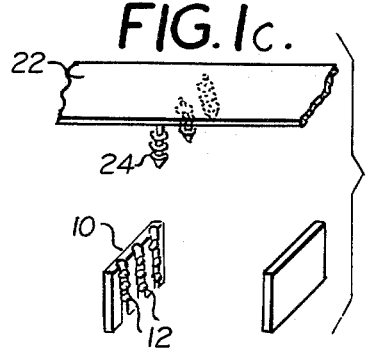
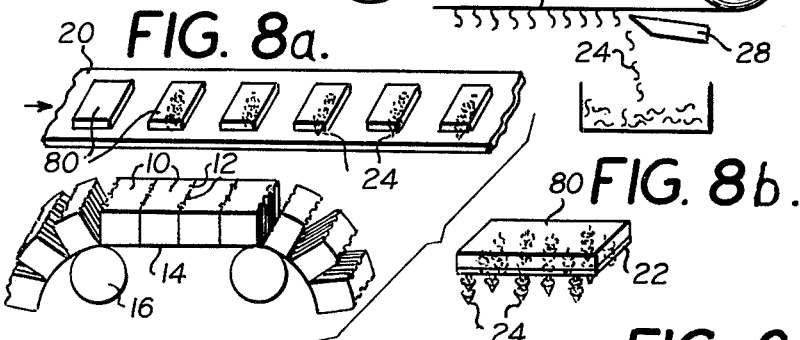
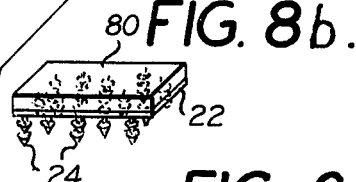
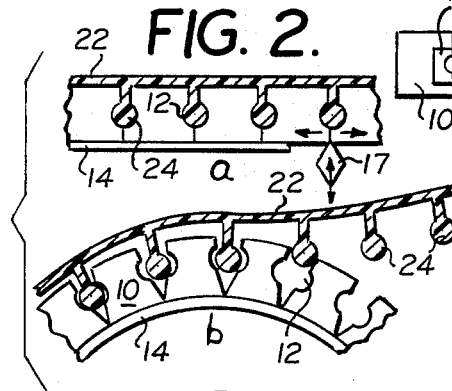
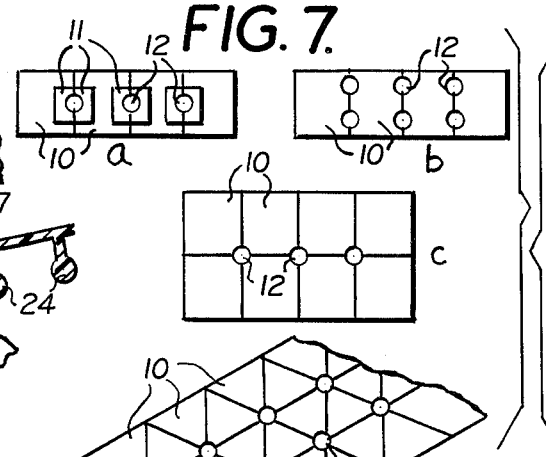
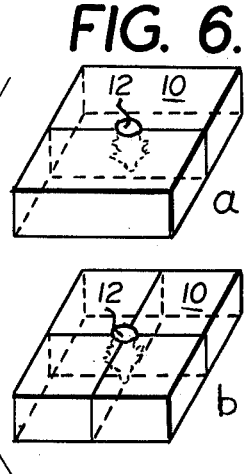
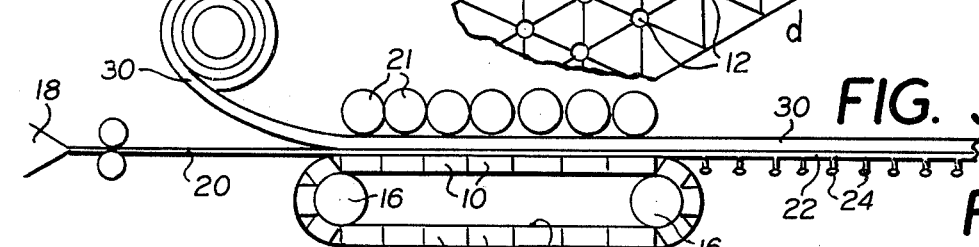
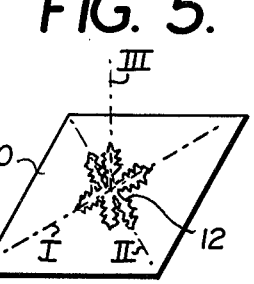
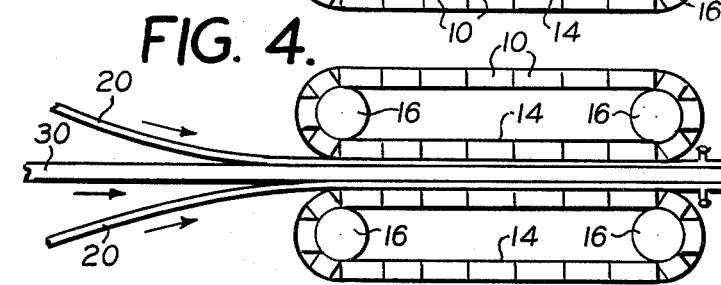
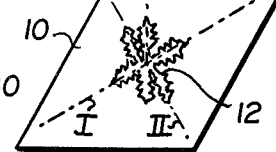

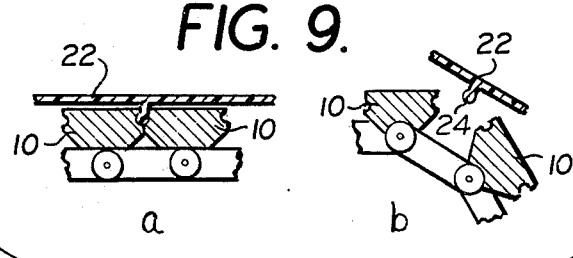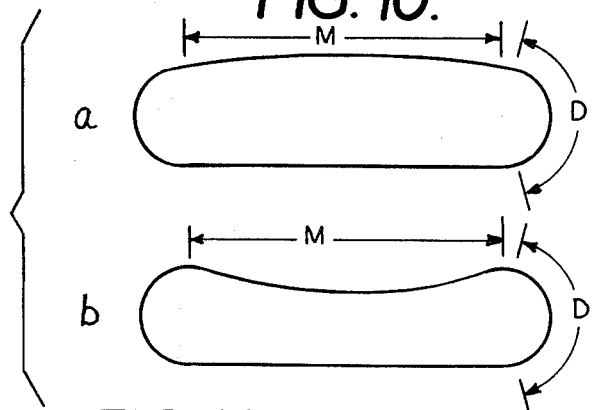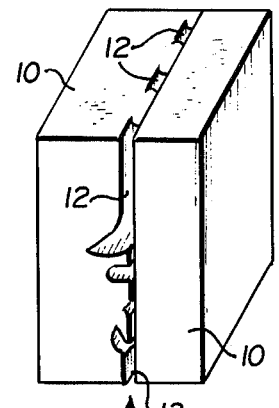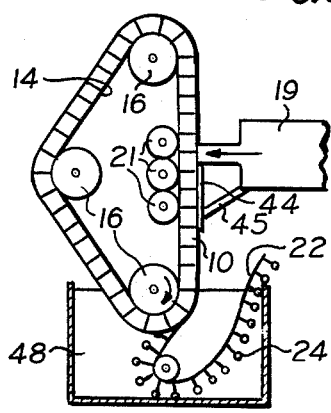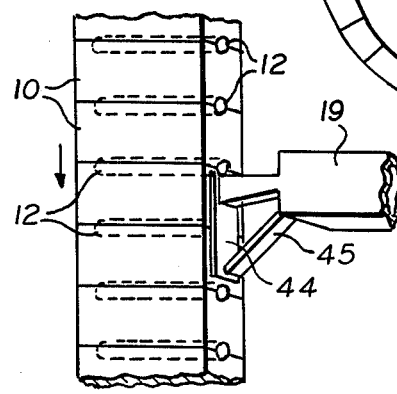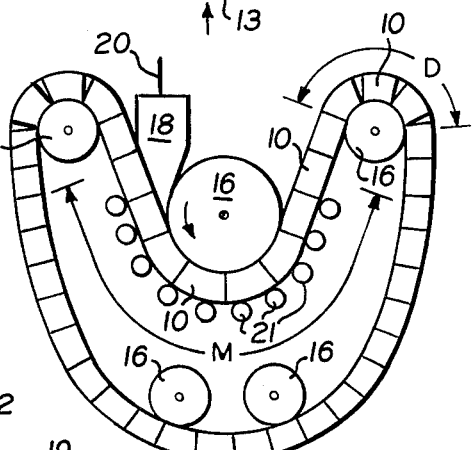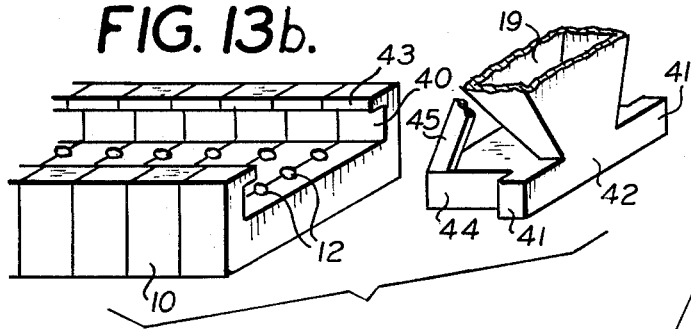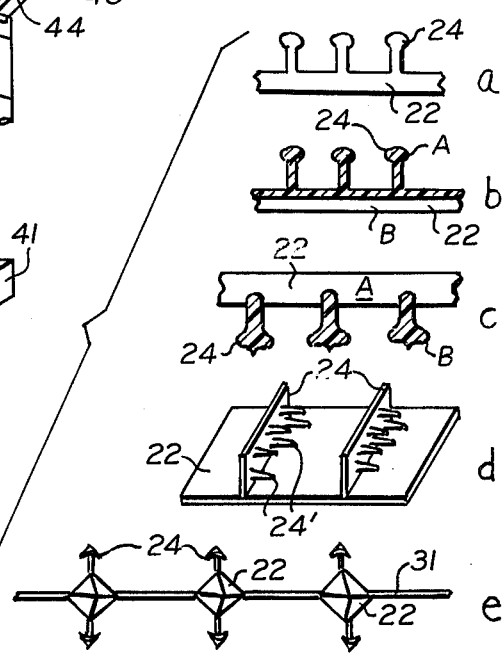

FIG. 16.
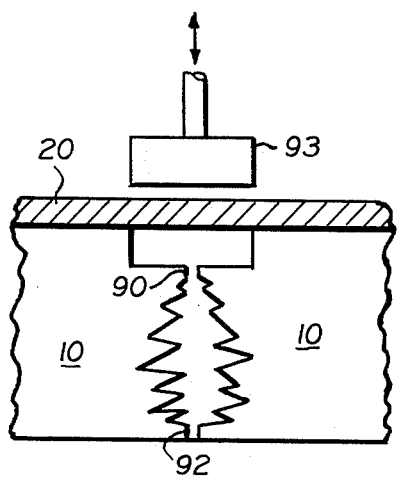
FIG. 18.
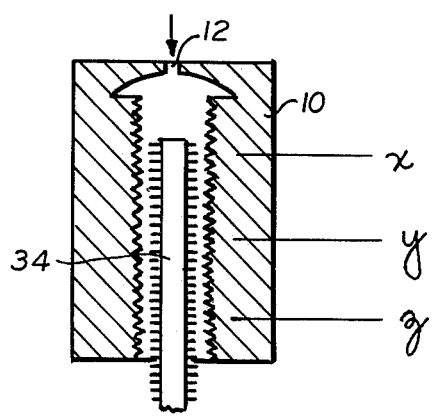
FIG. 17.
a 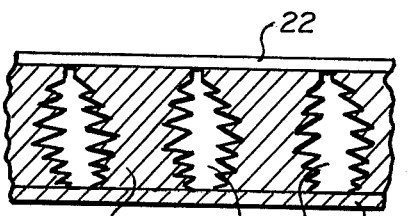
b 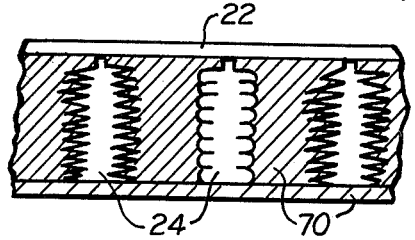
c 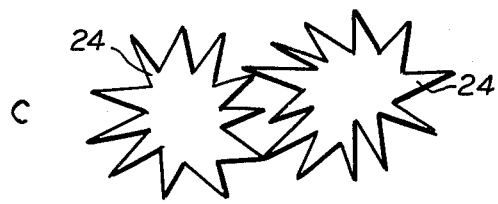
d 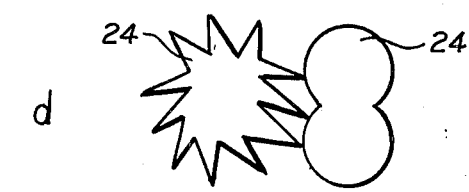
e 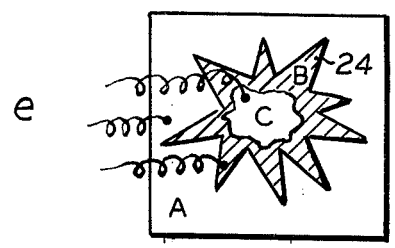
f 

TRAIN MOLDING APPARATUS

This is a continuation of application Ser. No. 559,284, filed on Mar. 17, 1975, and now abandoned, which in turn is a continuation of application Ser. No. 317,034, filed on Dec. 20, 1972, and now abandoned.

BACKGROUND

This invention relates to an apparatus for molding a plurality of three-dimensional articles from a material capable of flowing and solidifying.

More particularly, this invention relates to a continuous linear apparatus for molding a plurality of three-dimensional articles which can be discrete or integrally attached to a base in a single operation without utilizing mold gates, runners, sprues, and avoiding shrinkage and sink marks in the molded articles.

Injection and extrusion techniques are widely used for molding melt-formable material such as thermoplastic resins and metals. In injection molding, for economic reasons, a plurality of articles are molded at the same time using a system of runners and gates for each of the individual mold cavities. The gates are normally very small openings to facilitate separation of the molded articles from the injection mold runner. This leaves voluminous sprues which results in wastage because they serve no useful purpose after molding and have to be reground for remolding. Recycle of previously molded material has disadvantages in the fact that polymers commonly undergo physical and chemical degradation upon molding and grinding. In addition, injection molding has been plagued by shrinkage of the molded parts which occurs as the molded parts cool in the mold. This results in off-tolerance articles which are generally characterized by varying dimensions and sink marks.

The present invention provides a unique molding system wherein sprues and runners are eliminated and mold shrinkage and consequent sink marks are minimized. The invention can be carried out without material residues which means that a plurality of three-dimensional articles can be consistently molded from virgin material. The present invention is also characterized by the fact that there is minimum breakdown of the molecular structure or other degradation of the material being molded, such as occurs due to lengthy heating, recycling, etc. The present invention is further characterized by an ability to mold a plurality of three-dimensional articles which can be discrete or integrally attached to a base and which can have a structure heretofore only obtainable using a sequence of specialized techniques. Extremely small articles having microscopic details can be molded in thick profusion.

The present invention, therefore, makes it possible to rapidly and efficiently mold a plurality of three-dimensional articles in a single step. Preferably the apparatus of the invention is operated continuously in an endless manner.

RELATED APPLICATIONS

This application is related to copending application Ser. No. 279,114 filed Aug. 9, 1972, now abandoned in that the apparatus described and claimed herein can be used to mold the stratified and composite articles disclosed in said copending application.

SUMMARY

Apparatus of the invention for molding three-dimensional articles includes
a. carrier means adapted to travel in a first path followed by an arcuate path;
b. a plurality of contiguous mold means mounted on said carrier means with adjacent mold means forming mold cavities at contiguous interfaces transverse to the direction of travel when said carrier means travels in the first path, and separating from each other and opening said mold cavities when said carrier means travels in an arcuate path;
c. means for feeding a material capable of flow to said mold cavities; and
d. means to force said material into said mold cavities and to solidify same therein.

The process for molding a plurality of three-dimensional articles includes:
a. a molding zone having a plurality of advancing contiguous molds with adjacent molds forming mold cavities at contiguous interfaces transverse to the direction of motion;
b. a discharge zone following said molding zone wherein said molds travel in an arcuate path, become separated from each other and open said mold cavities;
c. feeding a material capable of flow to said molding zone, forcing same into said mold cavities and solidifying same therein; and
d. withdrawing said molded articles from said discharge zone.

DESCRIPTION OF THE DRAWING

FIGS. 1-*a–d* are diagrammatic side views illustrating preferred apparatus of the invention for carrying out the process thereof;

FIGS. 2-*a* and *b* are side views partly in cross-section illustrating in detail molding and discharging molded articles according to the invention;

FIGS. 3 and 4 are diagrammatic side view illustrating alternate embodiments of the invention for making multi-layered composite articles.

FIG. 5 is a perspective view illustrating a complex article having intricate portions and undercuts defined by the direction of all spatial coordinates I, II and III that can be molded according to the invention;

FIGS. 6-*a* and *b* are perspective views showing examples in which mold cavities can be defined according to the invention; and FIGS. 7-*a–d* are top plan views illustrating several ways in which mold cavities can be defined according to the invention.

FIGS. 8-*a* and *b* are perspective views partly broken away showing an embodiment for molding plaque-like articles according to the invention.

FIGS. 9-*a* and *b* are side elevational views partly broken away showing an alternate embodiment of the apparatus according to the invention.

FIGS. 10-*a* and *b* are schematic views illustrating the paths that can be traveled by the molds used in the invention in both the molding zone and the discharge zone.

FIG. 11 is a side view in elevation illustrating an alternate embodiment of the apparatus of the invention which is similar in construction and operation to the apparatus shown in FIG. 1-*b*.

FIG. 12 is a perspective view partly in cross-section showing an alternate embodiment wherein adjacent molds cooperate to define a series of mold cavities.

FIG. 13-a is a side view in elevation and FIG. 13-b is a perspective view partly broken away showing a portion of the apparatus of FIG. 13-a which itself shows an alternate embodiment for carrying out the invention, utilizing interlocking mold means and means for feeding and forcing the molding material into the mold cavities.

FIG. 14 is a perspective view partly broken away illustrating a further embodiment similar to that shown in FIG. 13-a, where the material to be molded is introduced to mold cavities opening to the side or end of the mold train.

FIGS. 15-a through e are side views in elevation partly broken away showing various articles that can be formed utilizing the invention.

FIG. 16 is a side view partly in cross-section illustrating an alternate embodiment of the invention wherein mechanical means are used to assist the filling of the mold cavities.

FIGS. 17-a through f are elevational views partly in cross-section illustrating unique articles that can be made from articles molded according to the invention; and FIG. 18 is a cross-sectional view of an embodiment of the invention for forming threaded articles according to the invention having different lengths but using the same mold cavity.

DESCRIPTION

Referring now to the drawing, in particular to FIGS. 1 and 2 thereof, the continuous molding apparatus of the invention is shown to include carrier 14 in the form of an endless belt which travels in a first path between rollers 16 and a convexly arcuate path around rollers 16. The first path between rollers 16 can be substantially linear (FIG. 1-b), slightly convex (FIG. 10-a), slightly concave (FIG. 10-b) or deeply concave (FIG. 11).

A plurality of molds 10 are mounted on the carrier 14. The individual molds 10 are contiguous with one another, with adjacent molds 10 forming mold cavities 12 at contiguous interfaces transverse to the direction of travel. As is more clearly shown in FIG. 1-a, the molds 10 are contiguous with one another and define the mold cavities 12 between adjacent molds 10 when the carrier 14 travels in the first path.

Mold elements 10 can be very thin, even sheet like, the only requirement being that each element 10 have sufficient thickness to form mold cavities 12 on one or both sides thereof.

The molds 10 become separated from each other and open the mold cavities 12 when the carrier travels in an arcuate path again, as shown in detail in FIGS. 1-a, 2-a, and 2-b.

Means, such as an extruder 18, feeds a material capable of flow 20 such as a thermoplastic or thermosetting material, to the molds 10 over the mold cavities 12 defined between adjacent continuous molds 10. The material 20 is forced into the mold cavities 12 using suitable pressure means such as pressure rollers 21, which can be independently driven and used in combination with an auxiliary endless belt 14' which travels around rollers 16 as shown in FIG. 1-b. Belts 14 and 14' can be link belts (FIG. 9); steel belts and the like.

In FIG. 1-b the upper belt 14' can move relative to or in coordination with lower carrier 14 with mold elements 10 thereon.

The material 20 after it fills the mold cavities 12 solidifies as molds 10, in contiguous relationship, travel in a linear path. As the molds 10 travel in an arcuate path and become separated from one another thereby opening the mold cavities 12, additional cooling means may be provided such as the air directing ducts 26. The molded article that continuously comes from the apparatus in one embodiment can be described as a base 22 with a plurality of three-dimensional articles 24 attached thereto. The molded article can be wound up as shown in FIG 1-b or the three-dimensional articles 24 can be severed from the base 22 by knife blade means 28 as shown in FIG. 1-d.

In another embodiment, the amount of material so delivered to the mold cavities 12 can equal this capacity so that a base will not be formed but only articles 24 which can be discharged with the aid of ejection pins known in the molding art.

FIG. 1-c illustrates complex three-dimensional articles 24 having undercuts which can be molded and attached to the base 22 utilizing the molds 10 defining the corresponding mold cavities 12 therebetween. In this particular embodiment, the three-dimensional articles 24 are multi-level gripping devices which can form a self-gripping connection with suitable receiving materials such as carpet-like materials, woven and nonwoven textiles and the like.

In operation, referring again to FIGS. 1 and 2 of the drawing, a material capable of flow, e.g., a thermoplastic or thermosetting material, is fed by means of extruder 18, for example, to the molding zone having a plurality of advancing contiguous molds 10 with adjacent molds defining outwardly facing mold cavities 12 therebetween.

A material capable of flow can be fed to the molding zone in any number of ways, alone or in combination. For instance, as illustrated by the arrows in FIG. 1-a, feeding can take place before, as or after the molds 10 close, forming cavities 12 in any of the directions indicated by the arrows in FIG. 1-a, that is, at a downward angle, straight down, from one or both sides, or from underneath. In the latter instance, the molds 10 are provided with bottom orifices 13 as shown in FIG. 12.

A discharge zone follows the molding zone wherein the molds 10 travel in an arcuate path, become separated from each other and open the mold cavities 12. The material 20 is rendered flowable and forced into the mold cavities 12 and solidifies therein while the molds 10 are linearly advancing in the molding zone. A vacuum applied to the underside of the molds can assist filling of the mold cavities. Once solidified, the molded articles are withdrawn from the discharge zone as shown in FIGS. 1-b, 1-c, 2-a and 2-b.

As shown in FIGS. 6-a, 7-a and 7-b the mold cavities 12 are formed at contiguous interfaces of adjacent individual molds 10. One or a plurality of mold cavities 12 can be defined between adjacent molds 10. This is shown, for instance, in FIG. 7-b. The formation of mold cavities 12 between interfaces of adjacent contiguous molds 10 are shown in cross-section in FIG. 2-a.

In practice, it is preferred to provide the molds 10 with inserts 11, which actually define mold cavities 12, as shown in FIG. 7-a. Thus it is possible to form carrier 14 and molds 10 in a permanent installation and charge the mold cavities 12 simply by replacing inserts 11.

One of the faces of a mold 10 can be flat (FIG. 12) and cooperate with the adjacent contiguous mold face which defines the bulk of the mold cavity.

In a further embodiment (FIG. 12) the mold cavities 12 are defined by the corners of longitudinal rows of adjacent molds 10. This shown, for example, in FIGS. 6-b, 7-c and 7-e. In order to facilitate separation of the adjacent contiguous molds 10 with the accompanying opening of mold cavities 12, the arrangement of the molds 10 as shown for instance in FIG. 7-c is adapted to travel in an arcuate path in both the longitudinal and transverse directions. This could be accomplished for instance by positioning radial ribs of protusions on the rollers 16 which would have the effect of causing the molds to separate from each other in the transverse direction as the carrier 14 and molds 10 travel thereover and become separated in the longitudinal direction.

FIGS. 3 and 4 illustrate alternate embodiments of the invention wherein a material 20 can be molded to a base 22 with three-dimensional articles 24 thereon and at the same time bonded or laminated to a second material 30. In FIG. 3 a one-sided operation is illustrated while in FIG. 4 a two-sided operation is illustrated. It should be pointed out that in FIG. 4 a single layer of material 20 can be fed to the nip of the apparatus to form an integral article having a core 22 with articles 24 molded on both sides thereof.

FIG. 5 illustrates in perspective that a complex article having undercuts and defined by all of the spatial coordinates I, II and III can be molded according to the invention.

FIGS. 8-a and 8-b illustrate a further embodiment, FIG. 8-a being an exploded perspective view showing a flowable material 20 with plaque 80 deposited thereon prior to passing through the apparatus of the invention. As the material 20 and the plaque 80 travel in the linear molding zone according to the invention, they are formed with a plurality of three-dimensional articles as illustrated in FIG. 1-c attached thereto by means of the base 22 which becomes laminated to the plaque 80. This is shown in greater detail in FIG. 8-b. By regulating the amount of material 20 delivered to the mold cavities in this embodiment, plaques 80 can be formed with articles 24 attached thereto without an intermediate base 22 as described previously, where the amount of material delivered to the mold cavities equals their capacity.

In carrying out the invention, the traveling molds 10 can be heated in the initial portions of the molding zone, for example by suitable radiation or connection means or by conduction heating via the pressure rolls. The traveling molds 10 can also be cooled following an initial heating zone or they can be cooled throughout the molding zone.

Heating during the molding operation can be accomplished by known means, such as radiant heating, ultrasonic heating, radio frequency heating, transfer heating using hot fluids, such as water and the like.

Subsequent cooling can be carried out by a transfer or heat exchange mechanism using fluids such as water, air or other cooling gases, dry ice, or by evaporation cooling, using sprayed water and the like.

Rollers 21 or other such means can be individually heated and/or cooled to obtain desired temperature profiles.

The pressure rolls 21 are only illustrative of several types of means that can be used to apply pressure to the material being molded to force same into the mold cavities 12. In FIG. 1-b for instance an auxiliary belt 14' is shown. The pressure can be applied constantly throughout the molding zone or it can be zoned, that is, be at one value in one part of the molding zone and another higher or lower value at another part in the molding zone. The pressure can also be applied in a predetermined profile that is steadily increasing or decreasing as the molds 10 travel through the molding zone.

Alternates to opening mold cavities 12 by advancing the molds 10 in an arcuate path, can be employed. For instance, adjacent molds 10 can be laterally displaced by wedge 17 or other such means as shown in FIG. 2-a.

In the present invention, the basic operation involves sheet or strip stock that can be wide or narrow or even in rod form, that is, soft and pliable at an elevated temperature, as for example an extruded or heated material, or flowable at room temperature as for example a thermosetting or similar curable material. The material is delivered to the upper surface of the outwardly facing mold cavities 12 and is forced or pressed in this state into the mold cavities 12 filling same. The material solidifies as the molds 10 defining closed mold cavities 12 continue to travel to the linear direction. As the molds 10 enter into the arcuate path, the molds open and the solidified molded article 22, 24 is easily removed therefrom.

Materials that can be molded by the invention can be described as liquid (or semi-liquid) or solid. Liquid materials include solvent-based compositions, such as organosols and plastisols that can be fed directly from a drum or tank to the molding zone. Other liquid materials include liquid or molten monomers and prepolymers that solidify or thermoset in the molding operation by cross-linking and/or by heating.

Solid materials are fed to the molding zone using screw extruder devices, ram injection machines, reciprocating screw-jam injection machines, and the like. Solid thermoplastic and thermosetting materials mentioned previously can be used in powder or pellet form and the like.

The material to be molded can be a preform that is brought to a flowable state prior to or during the operation of the invention. Such preforms include sheet forms, sheets with lengthwise, transverse or similar ribs and sheets with attached preforms, such as insulae, pegs, nibs and the like. Such ribs or attached preforms are preferably positioned on the sheet so as to register with the mold cavities 12 during the molding operation.

A unique advantage of the present invention is the fact that a preformed sheet stock can be continuously fed to the molding zone, resulting in an operation which is fast and economical and lends itself to the production of both simple, as well as very complex parts. Another advantage resides in the fact that the composition and properties of the sheet stock, for example its molecular orientation or laminar structure can be readily controlled, making it possible to form articles having unique properties such as a particular laminar structure or a desired molecular orientation.

The sheet stock 20 may be oriented before molding or may consist of layers of oriented sheets or strips axially or biaxially oriented. The strip or sheet stock 20 can be further oriented in a predetermined pattern with respect to the several layers in the strip stock. It is also possible to make layers of the same or different material or to have them of different colors. With these conditions it is possible to obtain articles having a highly oriented and patterned, macroscopic molecular structure which can be controlled and predetermined.

The strip stock to be molded can be made of a pure plastic, that is, thermoplastic or thermosetting or it can be filled with various materials commonly used for this purpose, such as extenders, inorganic and organic fillers, glass fibers and filaments, organic or metal fibers, blowing agents and the like, or it may have a laminar structure with fabric glass or metal mesh fabric, etc., or solid, perforated or expanded metal foil as a component of the strip stock 20. The sheet stock may also contain reinforcing materials, such as fibrils, long fibers, felt, fabric, mesh and other such particle aggregates. Such a composition when molded would have preselected and determined properties with respect to the base 22 and the molded articles 24 attached thereto.

FIGS. 9-a and b show an embodiment wherein the molds 10 have a wedge-like configuration and are attached at their base to link belt carrier device 16. This configuration of the molds 10 makes it possible to use a carrier means such as the link belt shown.

Referring now to FIGS. 10 and 11, the molds can travel in a substantially linear path as shown in FIG. 10-a in the molding zone or they can travel in a concave arcuate path as illustrated in FIG. 10-b. The molds traveling in the first path or molding zone are in contiguous relationship with respect to each other and the use of a concave path as shown in FIG. 10-b for instance aids in maintaining adjacent molds in a close contiguous relationship. In other words, a somewhat concave path for the molding zone can be used where extremely viscous materials are being molded requiring substantially high pressures to force same into the mold cavities 12. The discharge zone is illustrated diagrammatically by the letter D in FIGS. 10-a and b which follows the molding zone indicated diagrammatically by M. It is also possible to have the molds travel in a slightly convex path in the molding zone provided the individual mold elements 10 have a configuration which maintains the mold cavities 12 closed or well-defined in the molding zone.

In FIG. 11 the molding zone M is deeply concave and is followed by convexly arcuate discharge zone D. In this embodiment the molds 10 travel around centrally located roller 16 in the molding zone and pressure is maintained in the molding zone using a series of rollers 21 as described previously. The embodiment shown in FIG. 11 is especially suitable for molding highly viscous materials, for example from extruder 18 which can be located at the nip of the centrally located roller 16 and the traveling molds 10 as shown. This embodiment also is useful for molding articles 24 which are not attached to a base by delivering the amount of material from the extruder 18 in an amount equal to the capacity of the mold cavities 12. The roller 16 may contain channels (not shown) through which the molding material can be fed into the molds.

In FIG. 12 there is illustrated two mold elements 10, one of which forms the complex portion of the mold cavities 12 and the other of which is essentially flat and forms the simple dimension of the mold cavities 12. This arrangement is desirable for forming a wide variety of complex articles wherein the complexity of the article need only be defined by one-half of the adjacent mold parts 10.

FIGS. 13-a and b illustrate apparatus wherein the train of the molds 10 are provided with an overhang portion 43 which defines a channel 40. The feeder source 19 of the material being molded (which can be an extruder or injection molding device) is provided with central portion 42 and side track members 41 and lateral plate member 44 secured by brace member 45. This assembly is structured to interlock with the mold train, thereby making it possible to utilize the forces involved in extruding or injecting a moldable material for filling the mold cavities 12.

With the arrangement shown in FIG. 13-a it is desirable to operate vertically so that the molded article comprising base 22 with article 24 thereon can travel in the mold cavities 12 and be withdrawn therefrom in an immersion cooling tank 48. Other cooling means, as previously mentioned, can also be utilized in combination with the cooling tank or in place thereof.

FIG. 14 illustrates a further modification wherein a non-interlocking assembly, similar to that shown in FIG. 13-a, is used to force material to be molded into cavities 12 which open to the side of the mold train rather than to the front or top, as shown in FIGS. 1-b and 13-a. The arrangement shown in FIG. 14 can be used to mold relatively long thin articles, such as pen barrels, or other such articles having undercut portions, as shown for example in FIG. 1-c.

FIG. 15 illustrates various articles that can be obtained by varying or regulating the makeup of the material being molded and/or the manner of introducing the material to the molding zone. FIG. 15-a shows a relatively simple article comprising a base 22 with integral upright members 24 having undercuts, such as shown in FIG. 2. This type of article is obtained by introducing an extruded sheet, for example to the top of the molds in the molding zone. In FIG. 15-b the articles 24 are molded from a different material than the base 22 and can be obtained in the same manner as FIG. 15a but by starting with a two-layered sheet material or laminate.

In FIG. 15c the base 22 is formed from a material introduced to the top of the molding zone while the articles 24 are formed from a different material introduced to the molding zone from the bottom, for example through an orifice in the bottom of the molds, such as orifice 13 shown in FIG. 12.

FIG. 15-d shows an article that can be made from a preformed sheet with ribs, which can be formed into an article having the base 22 with integral upright ribs 24, having barbs or detents 24' extending from one or both sides of the ribs.

FIG. 15-e illustrates a unique article wherein three dimensional articles having a base 22 with integral upright gripping members 24 are molded onto a linear member 31, such as a string, wire, cable etc.

In FIG. 15 a reciprocating piston means 94 aids in forcing material 20 into the mold cavity 12 via runner or gate 90. Also shown in a vent 92 which is uniquely made possible in the invention. With this embodiment, it is possible to use lower pressures than used in conventional molding techniques where extreme pressure has to be used to force air out of mold halves via the parting line therebetween.

In the present invention, it is possible to continuously mold discrete particles having a predetermined shape and size, or a predetermined combination of sizes.

The invention provides complete control and freedom over the products produced. For example, there is control over thickness, patterns, orientation, alignment, embossing, molding by mounting articles as in FIG. 8, and the like. Thus the invention makes it possible to automatically and simply make sheet articles of closely controlled thickness in addition to molding integral articles on it.

The empty space between adjacent molded articles 24 attached to a base 22 can be filled by another medium forming two interpenetrating lattices. This is illustrated in FIGS. 16-a and b where complex articles 24 are molded according to the invention to a base 22 and the space therebetween is filled with a second material 70 forming two interpenetrating lattices. The material 70 can be partially or completely filled, as shown, for example using a metal plating technique to coat the intercontinuous walls of the articles 24 and base 22 or by infusion of a fluid which can later solidify forming the material 70. In this manner a unique type of interpenetrating lattic structure is created which has important structural, electrical, electromagnetic, electronic and aesthetic uses.

Interpenetrating lattices can also be formed as illustrated in FIGS. 17-c, d, e and f wherein spatial clusters 24 having a star shape as shown, or a dumbbell shape as shown, can interpenetrate in lattices A, B and C as illustrated in FIG. 17-e where the particles 24 has an orifice or in two lattices A and B as shown in FIG. 17-f where the molded article 24 is solid.

The present invention is particularly well suited for molding a large number of extremely small or relatively small articles having a complex shape continuously without loss of material. For example, threaded articles such as screws and bolts, can be made with a split head, a polygonal head, a Phillips head or various other heads, for example, a hexagonal shaped head. It is also possible to mold a series of threaded articles having the same diameter, thread and pitch yet vary in length using the same mold cavity. This is shown in FIG. 17 wherein mold part 10 defines a mold cavity 12. The incoming plastic material is of such a nature that it engages the walls of the cavity 12 to fill same progressively, thereby making it possible to form threaded articles having a length x, y or z depending on the desired size for the threaded article in the same mold cavity. It is also possible to make a plastic or similar material threaded article reinforced with a central rigid shaft 34 such as a metal shaft having a series of lateral protrusions thereon as shown in FIG. 17. Such a reinforcing centrally located shaft can be automatically inserted into the mold cavity prior to the plastic material entering same. Thus it is possible to mold reinforced plastic or other type material screws and other type threaded articles of varying length in the same mold cavity.

In one embodiment of the invention the molded articles 24 remain attached to a base 22. The base 22 may be formed from the same material as the articles 24 or as mentioned above, the base 22 can be made of a different material using in effect a composite or laminated strip stock 20. For example, the carrier ultimately forming the base 22 could be made of a woven or non-woven fabric, a web, a grid, a mesh, a metal sheet or foil, paper, wood plastic, sheet rock, or similar sandwich constructions and other structural panels. The molded articles comprising the different base material 22 and molded articles 24 can then be separated from the carrier as illustrated in FIG. 1-d.

In forcing the material 20 into the mold cavities 12 it is also possible in addition to using mechanical pressure as shown for instance in FIG. 1-b, to use liquid or gas pressure to replace or augment the mechanical pressure means.

A softened strip or sheet stock 20 may come from an extruder 18 as shown for instance in FIG. 1-b or it may come from a callendering unit, a draw-down or orienting roll apparatus, a laminating device or from a spool roll. It is also possible to introduce strip or sheet rock having a smooth or rough surface or a wavy, rippled or otherwise corrugated configuration to obtain different effects in the molded articles 24.

Referring again to FIG. 4, this embodiment can be used to obtain products having molded articles 24 on both sides of the end-product. These elements or articles 24 can be cut off to form individual articles or they can be punched through the article to form a composite two sided article. With two carriers 14, each with contiguous molds 10 moving in tandem, an endless split mold sequence can be realized (involving four or more part molds on each side of the material being molded) making it possible to economically mold articles having great complexity and relationship of shape, relative, size, relative orientation and combinations of different types.

The present invention has many advantages over conventional molding techniques. For instance, no sprue is formed and ejection pins, gates and other conventional devices used in injection molding, etc., are avoided. Also, in ejecting or discharging molded articles, the base 22 in effect aids in pulling or withdrawing molded articles 24 from the respective opened mold cavities 12 (FIG. 2-b).

It is also possible to carry out the invention in conjunction with other molding techniques as for example a piston aided injection molding operation to fill gated mold cavities formed between adjacent molds 10.

Any material capable of flowing and solidifying can be molded or formed according to the present invention. Such materials include metals, metal alloys, thermoplastic and thermosetting polymeric materials, natural and synthetic rubbers and elastomers and the like.

Thermoplastic materials are readily molded using the invention. Among specific materials that can be molded are polyamines such as nylon, polyesters, polyacetals, polyolefins such as polyethylene, polypropylene and the like, polysulfones, cellulose esters, polystyrenes, ABS polymers, polyphenylene oxide and sulfides, polycarbonates, halogenated polymers such as polyvinyl chloride and the like. Thermosetting materials include phenolic compositions, melamines, urethanes, epoxy resins and the like.

The material of the carrier or belt member 14 will depend in large part on the type of material being molded. For example if a thermoplastic material is being processed, then it is desirable to make the belt 14 out of hardened steel links forming a chain belt having durable mold elements 10 attached thereto. The combination of the carrier member 14 and the mold elements 10 is preferably made so that the mold parts 10 are held together under compressive forces sufficient to prevent the material being molded to flash or leak out of the mold cavities 12 along the parting line between the mold elements 10. When using casting type thermosetting materials, the carrier belt 14 may be made of a material having less strength than a chain belt. For example the carrier member 14 can be made of a metal sheet, a steel wire web as used for example in conveyors and the like. Carrier 14 can also be made or reinforced rubber or elastomer surrounding or encasing a fabric belt or the like.

Metals that can be cast or molded using the invention include low melting metals and alloys such as lead, bismuth, tin, cadmium, indium, galium or higher melting metals and their alloys such as zinc, aluminum, copper, etc.

Further materials that can be molded include polyvinyl, plastisols, silicone rubbers and elastomers, polyurethane elastomers and the like.

A further advantage of the present invention is the fact that a great variety of patterns with respect to the shape and size of the molded articles 24 can be achieved in the same operation since there is an unlimited variety of freedom regarding the types of cavities 12 present in a series of mold elements 10. It should also be noted that the cavities in a given series can be formed between the contiguous vertical interface of mold elements 10 as well as at the corners thereof.

It is also possible to post-treat molded articles made according to the invention. For example, a molded article made of a base 22 with articles 24 attached thereto can be stretched to orient same or it can be selectively cut and stretched to form an open-like structure. Other post-treatments can be carried out to modify the shape and/or the physical or chemical properties of the molded articles such as hardness, stiffness, chemical resistance and the like. Post-treating and post-forming techniques include air cooling, quench cooling, coating, annealing, electrical treatments, chemical treatments and the like. Secondary operations can also be carried out in conjunction with the invention such as bending, melting down, post shaping, cold heading, clipping and the like.

The present invention is useful for forming a virtually endless number of simple moderately complex and extremely complex articles. In FIG. 8, for example, an especially useful operation involves plaque-like articles such as letters and numbers for visual display devices rendered self-gripping to common materials such as carpets, non-woven and woven fabrics and the like, utilizing the molding process and apparatus of the invention. This involves the depositing of preformed plaque-like articles on an extruded or otherwise formed sheet stock which is then molded on the underside thereof according to the invention to produce a composite molded article comprising a plaque-like article having laminated thereto a backing which includes a plurality of relatively stiff upright gripping elements.

Further uses of products made by the invention involve three dimensional electronic components, such as capacitors, diodes, transistors, and the like, for example as shown in FIG. 17-e where contact leads are attached to the lattices A, B and C. Such three dimensional components are made possible by the invention and constitute a further embodiment thereof.

We claim:

1. Continuous molding apparatus for molding a plurality of three dimensional articles comprising
   a. carrier means adapted to travel in a first path followed by a arcuate path
   b. a plurality of contiguous mold means, said mold means having transverse and mutually adjacent pairs of faces which are transverse with respect to the carrier means, mounted on said carrier means adjacent ones of said mold means forming undercut mold cavities in said transverse and mutually adjacent pairs of faces of said mold means when said carrier means travels in the said first path, said mold faces containing said undercut mold cavities separating from each other and opening said mold cavities when said carrier means travel in said arcuate path
   c. means for feeding and forcing a material capable of flow into the said mold cavities.

2. Apparatus of claim 1 wherein said mutually adjacent pairs of faces in addition to being transverse in the carrier means are also at least longitudinal with respect to the carrier means, said mold cavities being located at the intersections of said transverse and said at least longitudinal adjacent pairs of faces.

3. Apparatus of claim 1 wherein the said carrier means comprises an endless belt means.

4. Apparatus of claim 1 wherein the first path is substantially flat and straight.

5. Apparatus of claim 1 in which the said first path is concave.

6. Apparatus of claim 1 wherein the means for feeder and forcing the said material capable of flow comprises a belt in contact with the contiguous molds on the first carrier means.

7. Apparatus of claim 1 wherein the said feeder and forcing means comprise a roller and an extruder.

8. Continuous molding apparatus for molding a plurality of three-dimensional articles comprising
   a. carrier means adapted to travel in a first path followed by an arcuate path;
   b. a plurality of contiguous mold means mounted on said carrier means, said mold means having transverse and adjacent pairs of faces which are transverse with respect to the carrier means, adjacent ones of said mold means forming undercut mold cavities in said transverse and adjacent pairs of faces of said mold means when said carrier means travels in said first path, the said mold faces separating from each other and opening said mold cavities when said carrier means travels in said arcuate path;
   c. means of feeding a material capable of flow to said mold cavities; and
   d. endless flexible belt means supported by roller means to force said material into said mold cavities and to solidify same therein.

9. Apparatus of claim 1 in which the said feeding and forcing means comprises a feeding means equiped with a spreading plate, the said spreading plate contacting the said mold means.

10. Apparatus of claim 9 in which said feeding means comprises an injector means.

11. Apparatus of claim 9 in which said feeding means comprises an extruder means.

12. Apparatus of claim 1 wherein said means for feeding and forcing the said material capable of flow comprises a roller in contact with the said mold means.

13. Apparatus according to claim 3 wherein the said feeding and forcing means comprises a second belt and an injector.

* * * * *